Figure 1:
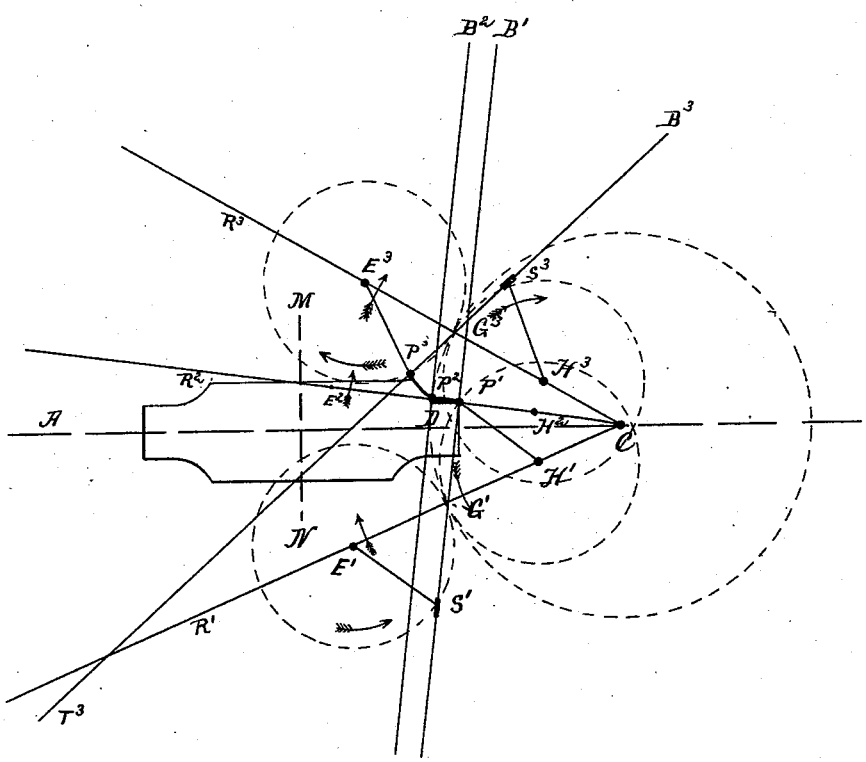

(No Model.)  5 Sheets—Sheet 1.

W. D. MARKS.
MACHINE FOR MAKING CUTTERS.

No. 353,034. Patented Nov. 23, 1886.

WITNESSES:

INVENTOR
William D. Marks
by his attorney
Chas A. Rutter.

(No Model.)  5 Sheets—Sheet 2.

W. D. MARKS.
MACHINE FOR MAKING CUTTERS.

No. 353,034.  Patented Nov. 23, 1886.

WITNESSES:  INVENTOR (No Model.) 5 Sheets—Sheet 3.

W. D. MARKS.
MACHINE FOR MAKING CUTTERS.

No. 353,034. Patented Nov. 23, 1886.

WITNESSES: INVENTOR.

(No Model.)  5 Sheets—Sheet 4.

W. D. MARKS.
MACHINE FOR MAKING CUTTERS.

No. 353,034. Patented Nov. 23, 1886.

WITNESSES:  INVENTOR (No Model.) 5 Sheets—Sheet 5.

W. D. MARKS.
MACHINE FOR MAKING CUTTERS.

No. 353,034. Patented Nov. 23, 1886.

WITNESSES:
Richard T. Mercer
Chas. A. Mahony

INVENTOR
William D. Marks
by his attorney
Chas. A. Rutter.

UNITED STATES PATENT OFFICE.

WILLIAM D. MARKS, OF PHILADELPHIA, PENNSYLVANIA.

MACHINE FOR MAKING CUTTERS.

SPECIFICATION forming part of Letters Patent No. 353,034, dated November 23, 1886.

Application filed May 29, 1886. Serial No. 203,595. (No model.)

*To all whom it may concern:*

Be it known that I, WILLIAM D. MARKS, a citizen of the United States, and a resident of the city and county of Philadelphia, and State of Pennsylvania, have invented a certain new and useful Machine for Making Mathematically-True Epicycloidal Cutters by Means of a Point-Tool, of which the following is a specification.

The object of my invention, which I call an "Epicycloidal-Cutter Machine," is to originate mathematically-true cutters for cutting the teeth of gear-wheels by means of a point-tool. The mechanism will so guide the point of the tool as to cut the faces of the cutter's teeth to a truly hypocycloidal form, and the flanks of the cutter's teeth to a truly epicycloidal form, so that the cutting of the solid rim of a blank wheel by one of these cutters will leave the teeth of the wheel with epicycloidal faces and hypocycloidal flanks.

This machine is particularly intended to evade all preliminary processes, such as the making of templets and the subsequent direct or pantographic transfer of their shapes, or the use of tools formed of an epicycloidal shape on the cutting-edges. The point of the cutting-tool, when the machine is adjusted, will describe successively the hypo and epi cycloidal curves required, and will pass from one curve to the other without changing the grip on the tool at the point where the hypocycloid merges into the epicycloid, and therefore without showing any jog in the shape of the cutter being formed. The center line of the tool-shank also will always be normal to the curves being cut. It is the fact that this machine will cause the points of the tool to originate and cut the mathematically-exact curves of the teeth of wheels for any describing-circle, any pitch-circle, and any number of teeth within limits of the size of the machine which renders it particularly useful, and in which it is believed to differ in principle and action from all machines heretofore devised for the making of epicycloidal cutters for the teeth of wheels.

Figure 2:
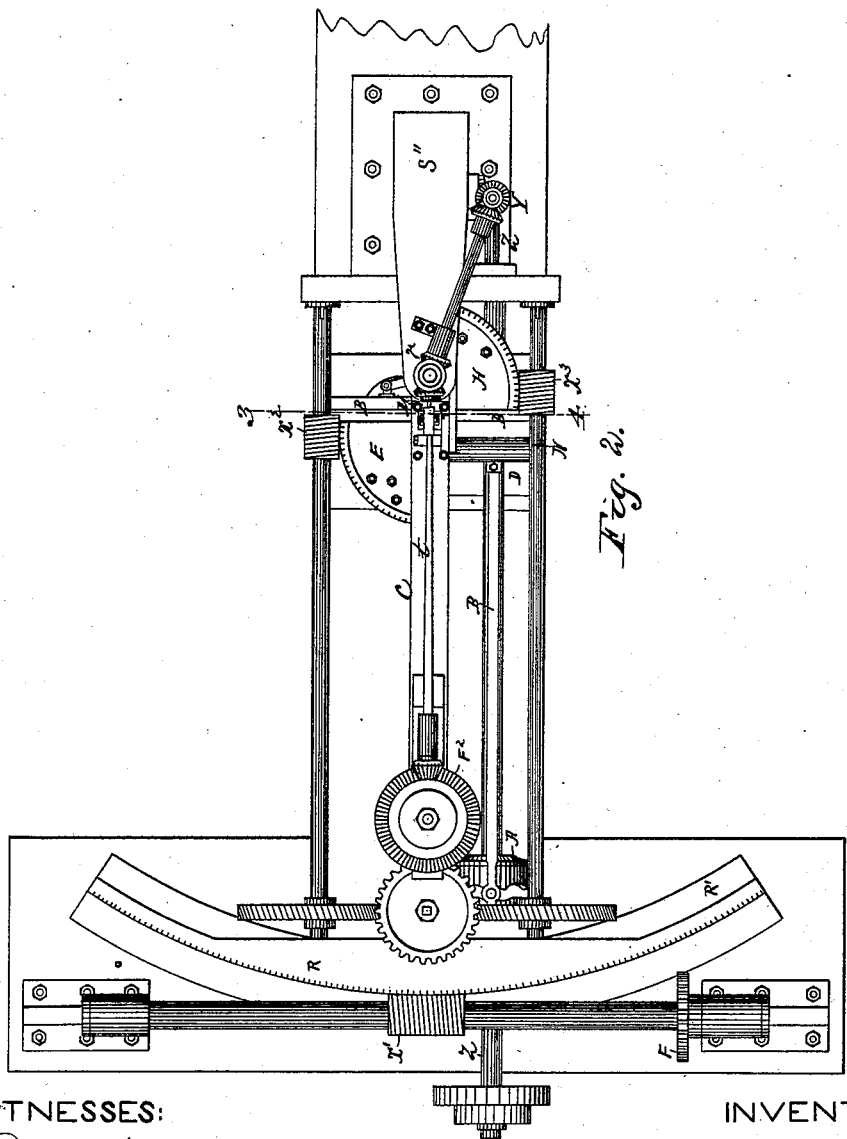
Figure 3:
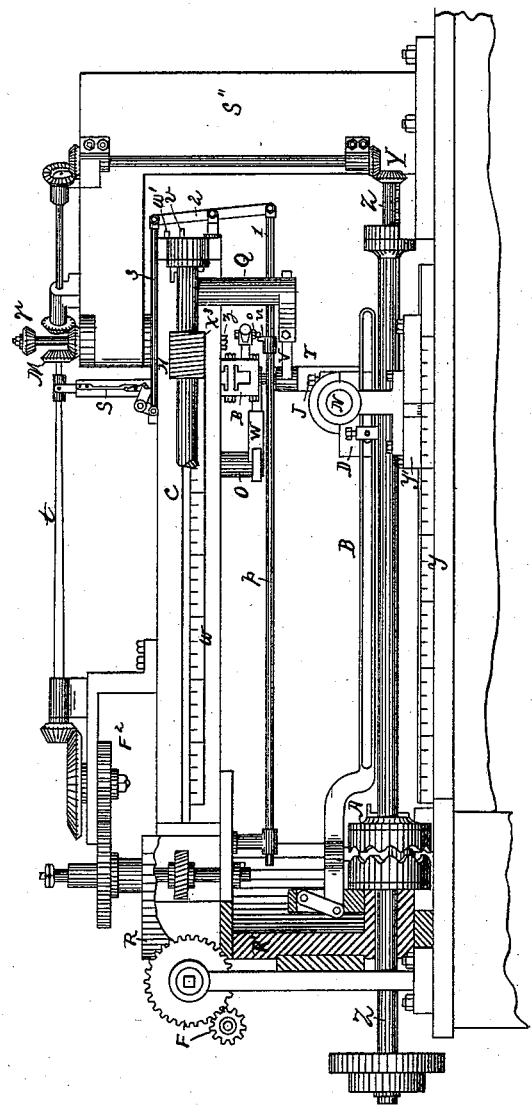
Figure 4:
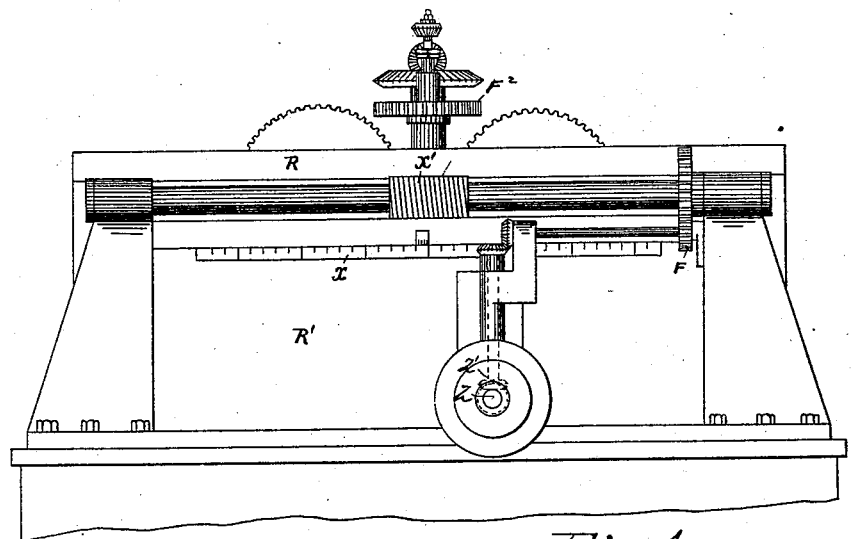
Figure 5:
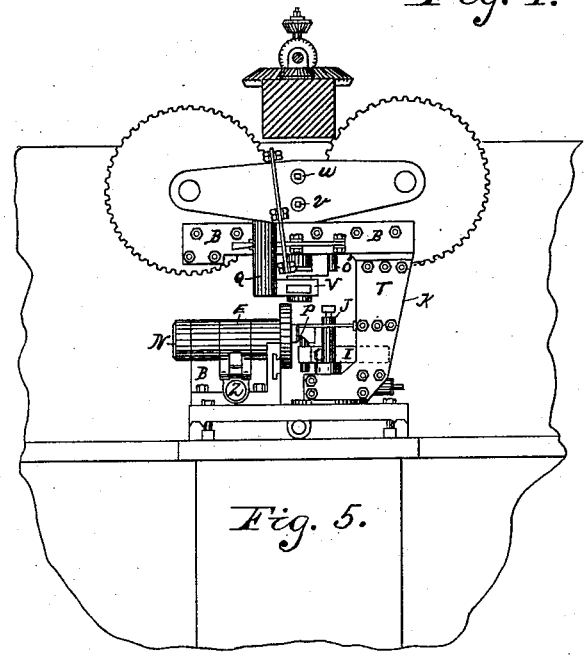
Figure 6:
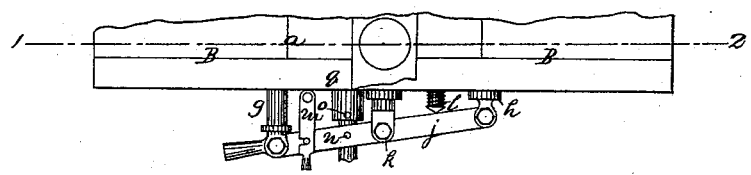
Figure 7:
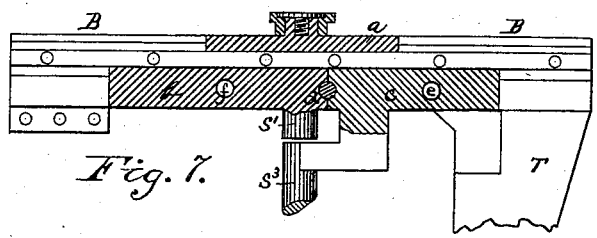
Figure 8:
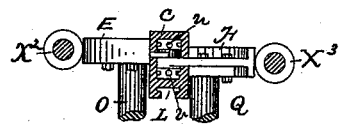
Figures 9, 10, 11, 12:
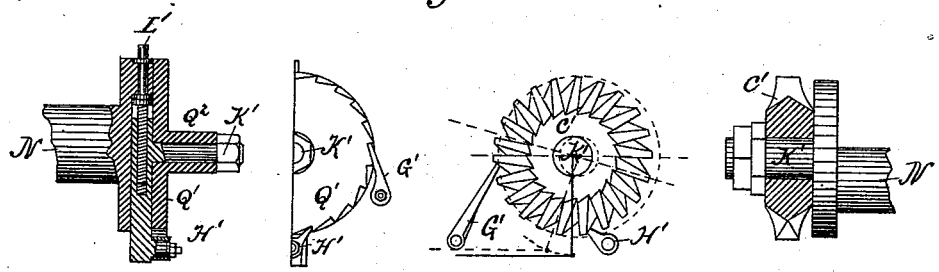

In the accompanying drawings, forming part of this specification, and in which similar letters of reference indicate similar parts throughout the several views, Figure 1 is a diagram explaining the mathematical theory on which the construction of the machine is based; Fig. 2, a top view of the machine; Fig. 3, a side view, partly in section; Fig. 4, a rear view of the machine; Fig. 5, a partial front view with the standard for center of main radius-bar removed; Fig. 6, a partial top view of the tool-bar; Fig. 7, a section of Fig. 6 on line 1 2; Fig. 8, a section of main radius-bar, Fig. 2, on line 3 4; Fig. 9, a half-section of a false eccentric mandrel to be used when the pawls do not engage the teeth of the cutter itself; Fig. 10, a partial front view of false eccentric mandrel; Fig. 11, a side view of the cutter, supposed to be placed on an eccentric mandrel, showing position of pawls used to give it an intermittent rotary motion; and Fig. 12 is a side view of eccentric mandrel with half-section of cutter in position, the pawls not being shown.

As this machine is believed to be entirely novel in its construction, it will be necessary to preface its detailed description by an explanation of its mathematical theory.

According to the plan sometimes pursued by mechanics, a circular templet of the pitch-radius of the wheel to have its teeth formed is cut out. (This is represented in Fig. 1 by the pitch-circle, whose center is $c$.) A describing-circle is then cut out, and a marking-point being fixed on its perimeter it is rolled on the outside and the inside of the pitch-circle, so as to form, by means of the point, the epicycloidal face and the hypocycloidal flank of the tooth desired. This describing-circle is represented in its various positions by the circles $E'$ $E^3$ and $H'$ $H^3$. If, now, we roll the describing-circle $E^3$ upon the outside of the pitch-circle $C$, so that the marking-point $P^2$ takes, finally, the position $P^3$, the point will have marked in its progress the epicycloid $P^2 P^3$. Then, placing the describing-circle $H'$ inside of the pitch-circle $C$, with the marking-point at $P^2$, if we roll the describing-circle to the position $H'$ the point will have marked the hypocycloid $P^2 P'$, and we have one side of an epicycloidal tooth, $P' P^2 P^3$. It will be observed, however, that if we take a radial bar, $C R^2$, and pivot to it another radial bar, $E^3 P^3$, and cause bar $C R^2$ to move through the angle $R^2 C R^3$, while bar $E^3 P^3$ moves through angle $C E^3 P^3$ with a constant velocity ratio to it, we trace the epicycloid $P^2 P^3$; also, if we take a radial bar, $C R'$, and pivot to it the radial bar H' P', and cause bar C R' to move through the angle R' C R², while bar H' P' with a constant velocity ratio closes through the angle P' H' R', we observe that the point P' will describe the hypocycloid P' P². The direction shown by the arrows will show how this can be done in a consecutive manner, so far as the mere tracing of the curves by a point is concerned.

Since the circular arc P² G³ of the pitch-circle C must equal the circular arc P³ G³ of the describing-circle E³, we have the following proportion: C G³ : E³ G³ :: angle P³ E³ G³ : angle G³ C P²; but as the radii of the pitch and describing circles are proportional to the assumed number of teeth on the circles, we can say, by the rule of three, as is the number of teeth in the wheel desired to the number of teeth in the describing-circle, so is the angle G³ E³ P³, which the describing radius-bar E³ P³ forms with the main radius-bar C R³, to the angle R³ C R², which the main radius-bar C R³ forms with its normal position C R².

According to Willis's system, the number of teeth assumed in the describing-circle would always be six, and according to the system most used in the United States the number of teeth assumed in the describing-circle would always be seven and a half. The construction of the machine, however, does not limit it to any fixed number of assumed teeth for the describing-circle, as will presently be seen from the detailed description, as well as how the relative angular positions of the main radius-bar and the describing radius-bars are obtained by means of feed motion.

The further condition, that the point and shank of the tool must always be normal to the epicycloidal and hypocycloidal curves being cut by it, remains to be fulfilled. In order to accomplish this the introduction of a tool-bar, T, Figs. 3 and 5, is necessary, and is represented in its consecutive positions by the lines T' B' T² B² T³ B³, Fig. 1. The shank I of the point-tool P, Figs. 3 and 5, is always fixed parallel to the upper part, B, of the tool-bar T, Figs. 2, 3, and 5.

While there is but one main radius-bar, C R', Fig. 1, there are two describing radius-bars, E' S' and H' P', one of which is fixed to the tool-bar at its end P', and the end S' of the other describing radius-bar, E' S', is free to slide along the length of tool-bar T' B'. When one of these describing-bars, as H' P', is fixed to the tool-bar T' B' at P', the end of the other, as S', is free to slide along tool-bar T' B' lengthwise. From the direction of the arrows it will be seen that as bar C R' moves along, carrying with it the centers of the describing radius-bars H' and E', the two describing radius-bars H' P' and E' S' close in upon the main radius-bars from opposite directions with equal angles, and that while the point P', at the pivoted junction of the tool-bar T' B' and the describing radius-bar H' P', is forcing the point P' of the tool to trace a hypocycloid, P' P², the end S' of the describing radius-bar E' S' holds the tool-bar in a normal direction to the hypocycloid P' P², because the angles G' E' S' and P' H' G' are always equal, and therefore the tool-bar T' B' crosses the pitch-circle at the point of contact of the assumed pitch-circles E' and H' and describing-circle C'. When in the progress of the main radius-bar C R' in the direction of the arrow it reaches the position C R², the describing radius-bars E' S' and H' P' will have closed completely, and main radius-bar C R² and describing radius-bars E² P² and H² P² will be in the same straight line, while the tool-bar T² B² will be at right angles to the main radius-bar C R². In this position the main radius-bar C R² moves on in the same direction toward the position C R³, while the slide S' becomes the pivoted point P³, and the former pivoted junction of the tool-bar T' B' and describing radius-bar H' P' becomes the slide S³. At the same instant that this exchange of the control of the tool-bar T² B² is made between the two radius-bars E² P² and H² P² the direction of angular motion of the describing radius-bars is reversed, as shown by the arrows, and the tool-bar T² B² and tool-point under P³ are forced to move in an epicycloidal curve by the pivoted point P³, and the shank of the tool in line with the tool-bar is held in a normal position, P³ B³, to the epicycloid P² P³ by means of the sliding end S³ of the describing-bar A³ S³.

For the sake of clearness an outline of a cutter in position to be cut has been added to Fig. 1. The line A C is the center line of the machine, and the line M N is the center line of the mandrel on which the cutter is placed.

In Figs. 2, 3, and 5, Z is the first-motion shaft of the machine. X', X², and X³ are tangent-screws, which are exactly similar. X' is actuated by a feed taken off the first-motion shaft Z at Z', and screws X² and X³ are both actuated by a feed taken off the first-motion shaft Z at Y. The velocity ratio of these two feeds for the tangent-screws X' and X² X³ is so proportioned by intermediate gearing that a change-wheel, F, Figs. 2, 3, and 4, having the same number of teeth as a straight flanked pinion in the basic system used, and another change-wheel, F², Figs. 2, 3, and 4, having the same number of teeth for which the cutter is being made, will produce the proper relative angles of main radius-bar and the two describing-bars, and consequently true epi and hypo cycloidal curves.

If for any reason it is not convenient or possible to adjust the feeds as stated, the proportionality of the angles may be preserved by multiplying or dividing the numbers of the teeth of the change-wheels F' and F² by a common factor. Say we set F' for fifteen teeth and F² for twelve teeth; we can just as correctly set F' for five and F² for four teeth, or F' for thirty and F² for twenty-four teeth.

The describing radius-bars W and V, Fig. 3, are firmly attached by pendants O and Q, Figs. 3 and 5, to the smaller sectors E and H, Figs. 2 and 8, and by means of the set-screws shown they may be adjusted to any required length. The course of the feed-motions from the first-motion shaft Z to the tangent-screws X' X² X³ can be traced without difficulty.

The tool-bar T (shown in detail in Figs. 6 and 7, and also in Figs. 2, 3, and 5) has at its top B a slide, a, Figs. 6 and 7, and is held snugly against the under side of the main radius-bar C, Figs. 2 and 3, by means of another slide in the bottom of the main radius-bar sliding in a slot, L, Fig. 8, the whole length of the main radius-bar C. The slide in the main radius-bar C is adjustable, and is fixed in place by means of a set-screw, z, Fig. 3. A downwardly-extending arm, K, from tool-bar T grips at its bottom a tool-post, J, which firmly holds in exact parallelism with the top B of the tool-bar a tool, I. The point P of the tool is exactly under the center of the tool-bar. Inside of the tool-bar T are two slides, b c, Fig. 7, which form part of the pivots S' and S³. Both of these slides can move outward from the fixed stop-pin d, which passes through the tool-bar.

When the slides are against the stop d, the pivots S' and S³ are exactly under the center of the bar T. In these slides b c are two bolt-holes, f and e, to receive the bolts g' and h', Fig. 6. These bolts are connected by a latch-bar, j, pivoted at k. The coiled spring l continually presses against the latch-bar j, and tends to lift the bolt h out of the hole e and to push the bolt g into the hole f in the slide b. The latch m is used to hold the latch-bar j against the pressure of the spring l when desired. When the bolt h is pressed home in the bolt-hole e, the slide c becomes a solid part of the tool-bar T. Therefore S³ becomes a fixed pivot, and S' a sliding pivot. When the bolt g' is home, the reverse is true, and S³ is a sliding pivot in the tool-bar, and S' is a fixed pivot. Both of these bolts cannot be home at the same time. When, however, the hole f in the slide b comes underneath the hole in the side of the tool-bar in which the bolt g rests, the spring l will send the bolt g home and release the slide e. Until hole f comes underneath bolt g the spring l cannot act. The pivots S' and S³ are grasped by the radius-bars W and V, Fig. 3.

Referring to Fig. 1, we observe that this change of a pivot into a slide must occur at the point P², and needs only occur once when changing from one curve to the other in shaping one side of the cutter. When the radius-bar is in the position T' B', S' has moved a long distance from the stop-pin d, Fig. 7, and therefore the bolt-hole f is not under the bolt g, but the bolt end presses on the surface of the slide b, which is underneath.

In the progress of the tool-bar T' B' toward the position T² B², Fig. 1, S' continually approaches P², at which point the bolt g, Fig. 5, shoots smartly home, and the slide b becomes the pivot S', while the former pivot S³ becomes the slide c. At the same instant that the slide S', Fig. 1, is changed to a pivot and the pivot P' is changed to a slide, as explained above, the direction of the angular motion of the describing radius-bars W and V, Fig. 3, must be reversed, as shown by the arrows in Fig. 1.

On the latch-bar j, Fig. 6, is a pin, n, projecting vertically downward a sufficient distance to strike a pin, o', on an adjustable lug, q, Figs. 3 and 6, which is adjusted on a reversing-rod, p. At the same instant when, by reason of the conjoined action of the slide b, Fig. 7, and the spring l, Fig. 6, the bolt g is sent home, the pin n, Figs. 3 and 6, strikes the pin o and throws miter-gear M, Figs. 2 and 3, from the lower to the upper of a pair of miter-gears, forming a spool, r, which is constantly driven in the same direction by a train of gears from the first-motion shaft Z at Y. The miter-gear M is at the end of a spring-shaft, t, which gives it a constant tendency to leave the lower gear of the spool r and to engage the upper gear of this spool. These upper and lower gears are fixed upon the same shaft and turn together, and when gear M engages with the upper gear its motion is reversed.

The tendency of gear M to engage the upper gear is resisted by a steel spring, S, Fig. 3, adjusted to yield to the smart stroke of the pin n, Figs. 3 and 6, upon the pin o by means of a connecting linkage, 1 2 3, Fig. 3. The centers of the small sectors E and H, which control the angular motion of the describing radius-bars W and E, are adjusted inside of the main radius-bar C to any radius by means of the scales w on each side. The tool-bar T is adjusted midway between the centers of the sectors E and H and w and v. Figs. 3, 5, and 8 are adjusting-screws for the centers of the sectors E and H.

x, Fig. 4, is a scale to enable the setting over of the main radius-bar a proportional distance to the half thickness of the cutter D, Fig. 1, at the pitch-line of the wheel for which the cutter is required.

The great sector R slides on top of support R', Figs. 2, 3, and 4. The main radius-bar C is underhung from a standard, S''. The mandrel N, Figs. 2, 3, and 5, can be adjusted at any horizontal distance from the center of the main radius-bar C by means of the scale Y, as it is bolted to an adjustable surface-plate, Y'.

On the first-motion shaft Z is placed a cam, A, which, by means of a slotted reciprocating bar, B, clamped at D to a pendent crank, E, Fig. 5, imparts a reciprocating motion to the mandrel N, on which the disk C', Figs. 11 and 12, to be formed into a cutter, is placed. Any other of the many means of obtaining a reciprocating motion will answer the purpose as well as the one described.

It is obvious that if we give a continuous rotary motion to the blank disk the tool under the control of the mechanism described will give to the outer edges of the disk on each side a mathematically-true epicycloidal and hypocycloidal shape, as shown in Fig. 12; and if this disk be notched, as shown in Fig. 11, we will have a cutter of the exact shape on the cutting-edges, but without the necessary clearance at the back, to enable it to cut rapidly and freely. To avoid this serious objection, I have devised an eccentric mandrel. (Shown in Figs. 9, 10, 11, and 12.)

Assuming the cutter C' to be notched, as shown in Fig. 11, a stationary spring-pawl, G', engages the teeth and prevents the rotation of the cutter C' toward this pawl, but permits rotation in the opposite direction, while a reciprocating pawl, H', attached to the mandrel N forces the cutter to turn through the arc of one tooth for each complete reciprocation. If, now, instead of placing the cutter concentrically with the mandrel N, we place it on an eccentric mandrel, K', the cutter still has a rotary motion, and is thrown slightly forward at each oscillation of the swinging crank E', Fig. 5, thus enabling the necessary clearance for the teeth of the cutter. If the eccentric mandrel K' is placed below the center of the mandrel N, the cutter will be drawn backward as well as rotated at each oscillation of the crank E, Fig. 5. The pawl G' catches the next tooth, and the cutter must turn on its mandrel a little in returning to its original position. The amount of eccentricity of the two mandrels divided by the radius of the cutter being cut gives the tangent of the angle of clearance or angle of relief of the cutting-edges of the cutter. In order to enable this eccentricity to be varied at will, and also to avoid using the teeth of the cutters as ratchets, I have devised the false eccentric mandrel shown in Figs. 9 and 10. N is the stationary or true mandrel. L' is a screw, which adjusts a slide having attached to it the eccentric mandrel K' and the spring-pawl H'. G' is a spring-pawl attached to the frame-work supporting the mandrel N. K' is the false mandrel, consisting of a ratchet-wheel, Q', and a cannon, Q², to which the cutter to be formed is keyed. Its mode of action is exactly similar to that described in Figs. 11 and 12 for the cutter C' alone.

Having thus described my invention, I claim as new and desire to secure by Letters Patent—

1. The combination of the tool-bar T, radius-bars W and V, slides $b$ and $c$, pivoted at S' and S³, bolts $g$ and $h$, striking-pin $n$, reversing-rod $p$ 1 2 3, tool-post J, and the pivoted slide $a$, and mechanism, as described, for driving them and for reversing the motion of the machine, all substantially as set forth.

2. The combination of mandrel N, eccentric mandrel K', cutter C', stationary pawl G', and actuating-pawl H', substantially as and for the purposes set forth.

3. The combination of mandrel N, adjusting-screw L', adjustable eccentric false mandrel K', actuating-pawl H', stationary pawl G', and the false mandrel Q' Q², all arranged and operating substantially as and for the purposes set forth.

4. The combination of the feed-motions F F², tangent-screws X' X² X³, sector R, and adjustable sectors E and H, main radius-bar C, describing radius-bars W and V, tool-bar T, latch-bar $j$, spring-bolts $g$ and $h$, pivoted slides $b$ and $c$, tool-post J, eccentric mandrel K', eccentric false mandrel Q' Q², cam A, and reciprocating bar B, and driving mechanism, as shown, substantially as set forth.

WM. D. MARKS.

Witnesses:
PHILIPPUS W. MILLER,
CHAS. A. RUTTER.